United States Patent
Boroughs et al.

(10) Patent No.: US 6,834,350 B1
(45) Date of Patent: Dec. 21, 2004

(54) SECURE AND DIFFERENTIATED DELIVERY OF NETWORK SECURITY INFORMATION

(75) Inventors: Randall Craig Boroughs, Woodinville, WA (US); David Wayne Bonn, Everett, WA (US)

(73) Assignee: WatchGuard Technologies, Inc., Seattle, WA (US)

( * ) Notice: Subject to any disclaimer, the term of this patent is extended or adjusted under 35 U.S.C. 154(b) by 0 days.

(21) Appl. No.: 09/347,387

(22) Filed: Jul. 6, 1999

(51) Int. Cl.[7] ................................................. H04L 9/00
(52) U.S. Cl. ....................................... 713/200; 713/201
(58) Field of Search .............................. 713/200–201, 713/176, 154; 370/389, 392, 367; 711/150, 205; 709/223, 225–226, 238

(56) References Cited

U.S. PATENT DOCUMENTS 5,511,122 A  *  4/1996  Atkinson ..................... 380/25
5,680,461 A  *  10/1997  McManis ..................... 380/25
6,480,963 B1  *  11/2002  Tachibana et al. .......... 713/201

* cited by examiner

Primary Examiner—Kim Vu
Assistant Examiner—Leynna Ha
(74) Attorney, Agent, or Firm—Perkins Coie LLP

(57) ABSTRACT

The present invention is directed to a facility for distributing network security information. The facility receives network security information and recipient selection information specifying a characteristic of perspective recipients to be used in selecting recipients for the security information. The facility then compares the received recipient selection information to each of a plurality of perspective recipient profiles. Each perspective recipient profile corresponds to one or more perspective recipients and indicates one or more characteristics of the perspective recipients relating to the receipt of network security information. Based upon this comparison, the facility selects at least a portion of the plurality of perspective recipients as recipients of the network security information, and addresses the network security information to each of the selected recipients.

9 Claims, 25 Drawing Sheets

WatchGuard LiveSecurity REGISTRATION

Thank you for using the award-winning WatchGuard Security System. At the end of this registration process you will be provided with a software package that will install LiveSecurity.

Please refer to our privacy statement for information about WatchGuard's data privacy policies.
Fields with an asterisk (*) must be completed.

❶ THE FACTS

| Field | Value | Field | Value |
|---|---|---|---|
| *First Name: | John | *Last Name: | Matthews |
| *Title: | Systems Administrator | *Company: | Acme Industries |
| *Street Address 1: | 101 Arbor Way | Street Address 2: | |
| *City: | Seattle | *State/Province: | Washington |
| *Zip/Postal Code: | 91804 | *Country: | United States |
| *Phone Number: | (206)321-7654 | Fax Number: | (206)321-7653 |
| *E-Mail Address: | john@acme.com | URL: http:// | www.acme.com |
| *subscriber identifier | 1516 | | |
| *primary network security device type: | FireBox 100 | *network security software version: | 2.3 |
| secondary network security devices: | Cisco router | applications: | MS Exchange, MS Office |

❷ THANK YOU!

FIG 7

| subscriber identifier | primary network security device type | network security software version | contract type | maximum permissible level of encryption |
|---|---|---|---|---|
| 1516 | FireBox 100 | 2.3 | full | strong |
| 2497 | FireBox II | 2.3 | full | weak |
| 3216 | n/a | n/a | alerts only | medium |
| ... | | | | | primary subscriber information database table

*Fig. 8A*

| subscriber identifier ⌐ 851 | subscriber attribute ⌐ 852 | attribute value ⌐ 853 |
|---|---|---|
| 1516 | application | MS Exchange |
| 1516 | application | MS Office |
| 1516 | secondary security device | Cisco router |
| 3216 | application | Novell NFS |
| ... | ... | ... | secondary subscriber information database table

*Fig. 8B*

| distribution contents | subscriber identifier | date delivered |
|---|---|---|
| (binary executable) | 1516 | 6/1/99 2:15a |
|  | 2497 | 6/1/99 12:03a |
|  | 3716 | 6/15/99 3:04p |
|  | ... | ... |
| (text of alert) | 2497 | |
|  | 3216 | 6/3/99 1:21p |
|  | 4119 | 6/3/99 1:06p |
|  | ... | ... |
| (network security rule) | 2497 | |
|  | 6912 | |
|  | 6915 | |
| ... | | |

*Fig. 13*

SECURE AND DIFFERENTIATED DELIVERY OF NETWORK SECURITY INFORMATION

TECHNICAL FIELD

The present invention is directed to the field of computer networking, and more particularly, to the fields of network security and information delivery.

BACKGROUND OF THE INVENTION

As computer systems become more ubiquitous, it becomes increasingly common for computer systems to be connected together in computer networks, such as the Internet. Such increased connectivity between computer systems provides significant benefits by enabling the exchange of useful information between users of connected computer systems.

Unfortunately, increased connectivity between computer systems also creates significant hazards. Malicious or careless users can often negatively affect target computer systems to which their computer systems are connected by, for example: misappropriating, deleting, or modifying important and/or valuable data; misappropriating valuable services; or temporarily or permanently impairing the operation of the computer system. While the hardware and software comprising a computer system is generally designed to prevent these sorts of "attacks," it is nonetheless often possible for outsiders to discover and exploit vulnerabilities in particular hardware, software, or both.

In order to secure their computer systems against such hazards, users and system administrators often seek one-on-one assistance from network security experts. Unfortunately, the scarcity of such experts and the significant costs of retaining them make them inaccessible to many users and system administrators. This is exacerbated by the ongoing discovery of new target computer system vulnerabilities and the development of increasingly sophisticated forms of attacks.

In view of the need by many users and system administrators for prompt and ongoing assistance in securing their computer systems, an automated system for securely distributing security-related information from network security experts to a substantial number of recipients automatically selected from a list of subscribers based upon their security characteristics would have significant utility.

BRIEF DESCRIPTION OF THE DRAWINGS

FIG. 7 is a display diagram showing a web page for soliciting information about a new subscriber.

FIGS. 8A–8B are data structure diagrams showing typical contents of the subscriber information database.

FIG. 13 is a data structure diagram showing typical contents of the addressed distribution database.

DETAILED DESCRIPTION OF THE INVENTION

Figure 1:
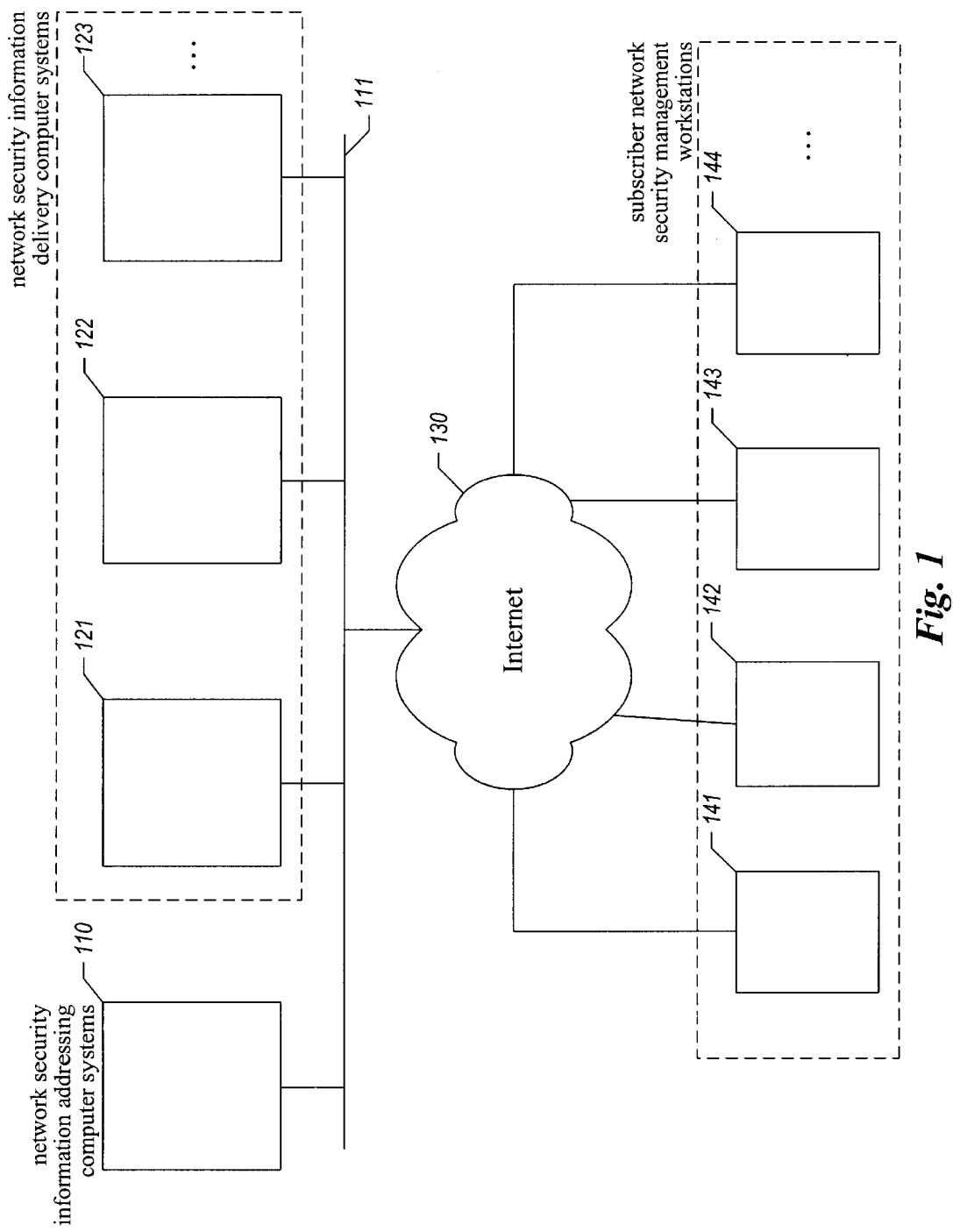
FIG. 1 is a network diagram showing the connection of computer systems involved in the delivery of distributions by the facility.

The present invention provides a software facility for the secure and differentiated delivery of network security information ("the facility") to support a network security information service. In a preferred embodiment, the facility selects addressees for a particular instance of network security information (a network security information "distribution") based on security characteristics of subscribers to which the distribution relates, securely and reliably delivers the distribution to each selected addressee, and enables a user at the subscriber to promptly and conveniently review and act on the distribution.

Distributions are preferably prepared by a team of network security experts. A distribution may contain information, such as textual information, for review by a network security administrator. For example, the distribution could contain information describing a newly-discovered form of network attack, and explain how network security equipment or software already being used by the subscriber protects the subscriber from such attacks. A distribution may also contain software. Such software can include both software designed to execute once to ensure that the subscriber's network is protected from a certain type of attack, or new or updated network security software that executes continuously to ensure the security of the subscriber's network. A distribution may also contain data used for network security purposes. For example, where a subscriber uses a particular network security device that operates based upon a set of security rules, a distribution to the subscriber may contain additional rules to be added to the set used by the network security device.

Because some distributions are only useful to subscribers having certain security characteristics, such as those having a particular network security device, the facility preferably selects addressees for each distribution from the subscribers registered with the network security information service. In this regard, the facility preferably uses a subscriber information database that stores information about each subscriber registered with the network security information service. For example, the subscriber database may contain, for each subscriber, an indication of the types of network security equipment, network security software, and applications used by the subscriber. When the facility receives a new distribution, it preferably receives with it an addressing query designed to select addressees for the distribution. The facility performs the addressing query against the subscriber information database to select addressees of the distribution. By selecting addressees for a distribution (or "addressing" the distribution), the facility maximizes the extent to which each registered subscriber receives the distributions that relate to it, and minimizes the extent to which each registered subscriber receives distributions that do not relate to it. Also, by directly controlling the set of addressees, the facility ensures that distributions are not delivered to parties other than subscribers.

After the distribution is addressed to addressees among the registered subscribers, the facility attempts to deliver the distribution to each of the addressees to which the distribution is addressed. The facility may preferably deliver distributions either by secure email sent from the network security information service to the addressees, or using a client polling procedure in which a client program at each subscriber periodically polls a server maintained by the network security information service for new distributions addressed to its subscriber. In order to implement the client polling procedure, in certain embodiments, the facility utilizes BackWeb Foundation software, available from BackWeb Technologies of San Jose, Calif. For emailed distributions, a verified email address for the subscriber is preferably used. For distributions delivered by the client polling procedure, polling requests from the client preferably include a secret unique identifier issued to the subscriber, encrypted using public key encryption. These measures help ensure that the distribution is delivered only to the subscribers to which it is addressed.

During delivery, each distribution is preferably encrypted to prevent anyone intercepting the distribution from discerning its content. Each distribution is preferably also signed in way that reliably indicates both (1) the source of the distribution, and (2) the contents of the distribution when the distribution left its source. This signature is preferably used by a component of the facility executing at each subscriber to ascertain whether each distribution (1) is from the network security information service or another trusted source and (2) has not been altered since it left that source. The subscriber component of the facility preferably only allows the subscriber to make use of distributions meeting both of these conditions.

The client program of the facility preferably also alerts a user at the subscriber as soon as a distribution is received, displays information about the distribution, and facilitates the application of the distribution to enhance the level of security of the subscriber's network.

FIG. 1 is a network diagram showing the connection of computer systems involved in the delivery of distributions by the facility. Distributions are initially received in a network security information addressing computer system ("addressing computer system") 110 operated by the network security information service. For each distribution, the addressing computer system 110 determines a list of addressees for the distribution, and forwards this list of addressees along with the distribution to a number of network security information delivery computer systems ("delivery computer systems") operated by the network security information service, such as delivery computer systems 121–123. The addressing computer system is preferably connected to the delivery computer systems by a secure network 111, such as a physically secure network or a virtual private network. The delivery computer systems are connected via the Internet 130 to a number of subscriber network security management workstations at subscriber sites, such as subscriber network security management workstations 141–144. Using one of the approaches described below, the delivery computer systems deliver the distribution to each of the subscriber computer systems to which the distribution is addressed. The delivery computer systems are preferably distributed geographically in accordance with the geographic distribution of subscribers.

Figure 2:
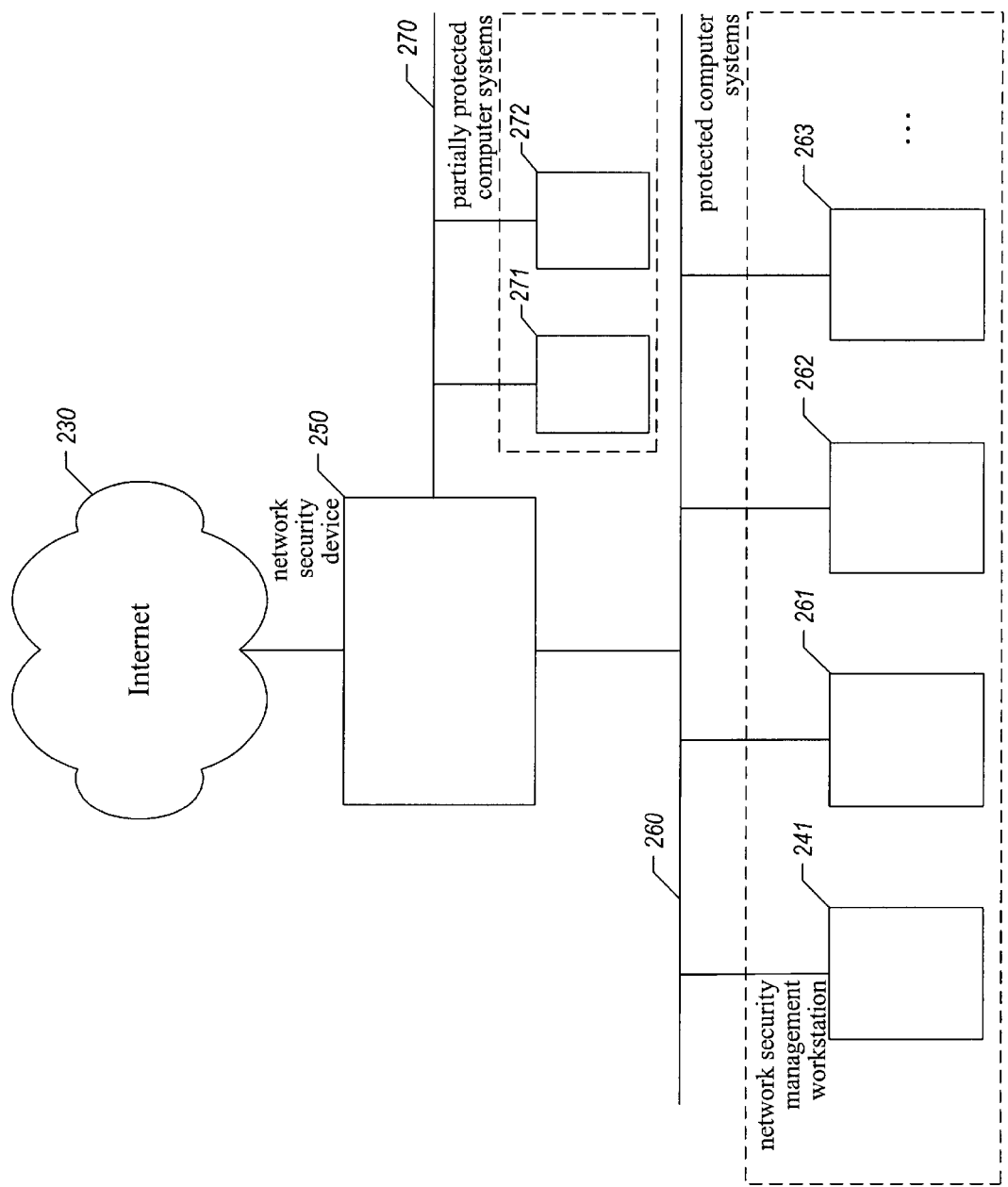
FIG. 2 is a network diagram showing a typical secured network operated by a subscriber.

FIG. 2 is a network diagram showing a typical secured network operated by a subscriber. A secured network 260 is connected to the Internet 230 by a network security device 250, such as a WatchGuard Firebox II network security device available from WatchGuard Technologies, Inc. of Seattle, Wash. The network security device 250 protects computer systems of the subscriber by controlling the traffic that can flow between the Internet 230 and protected computer systems of the subscriber, such as protected computer systems 241, 261, 262, and 263. Among the protected computer systems is a network security management workstation computer system 241. The network security management workstation computer system 241 is designated to receive distributions delivered by the facility. The network security device 250 also preferably provides partial protection to partially protected computer systems of the subscriber, such as computer systems 271 or 272 in a partially secured network 270. Typically, partially protected computer systems provide a service such as web serving that requires a less restricted connection to the Internet.

Figure 3:
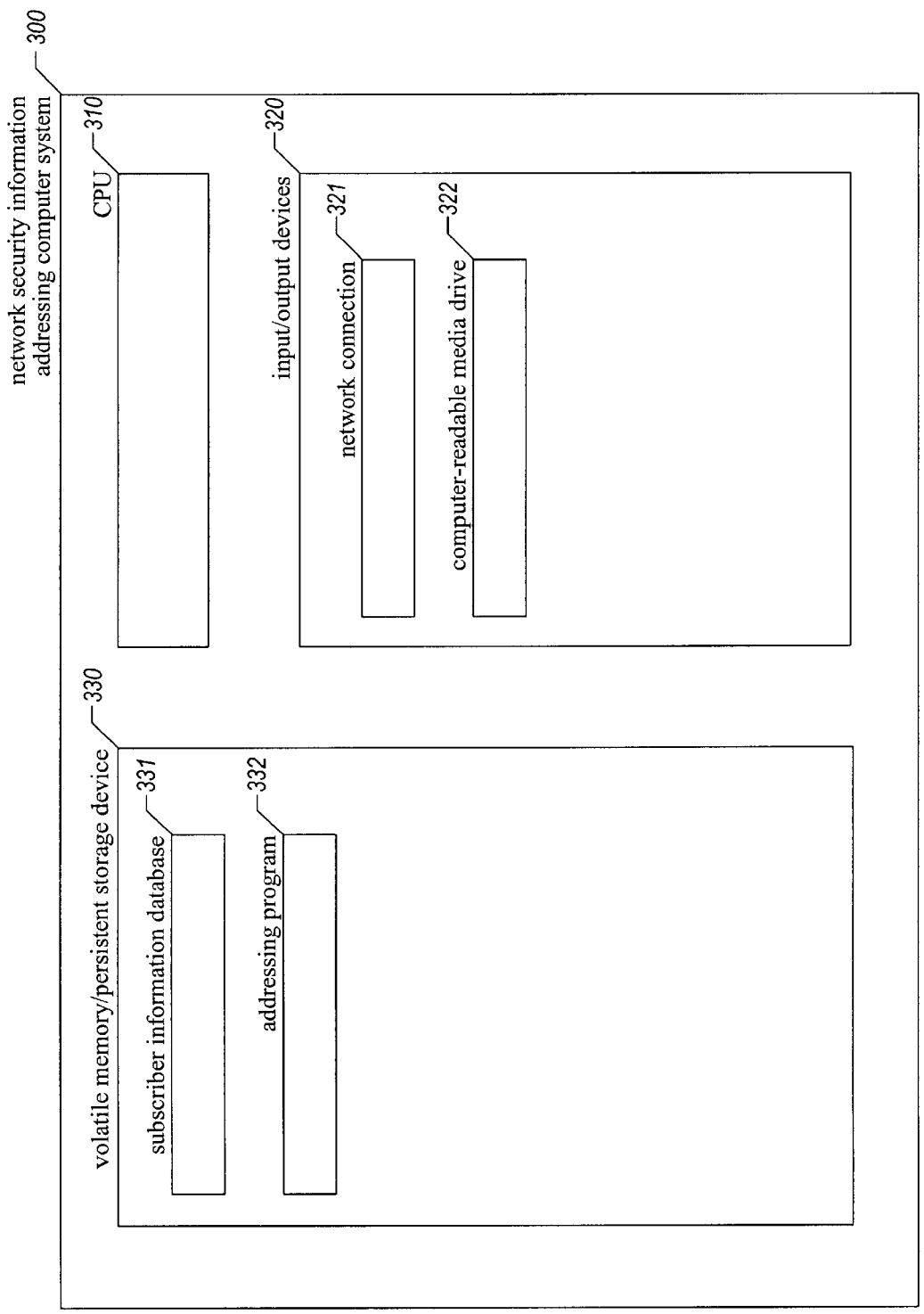
FIG. 3 is a high-level block diagram of the addressing computer system.

FIG. 3 is a high-level block diagram of the addressing computer system. The addressing computer system 300 contains one or more central processing units (CPUs) 310, input/output devices 320, and a volatile computer memory/persistent storage device (memory) 330. Among the input/output devices is a network connection 321, through which the addressing computer system 300 may communicate with other connected computer systems; and a computer-readable media drive 322, which can be used to install software products, including portions of the facility, which are provided on a computer-readable medium, such as a CD-ROM. The memory 330 preferably contains a subscriber information database 331 containing information about each registered subscriber. As is discussed further below, this information includes security characteristics of the subscriber that are used to determine whether to deliver particular distributions to the subscriber. The memory 330 preferably further contains a portion of the facility called the "addressing program" 332, which receives distributions and uses the subscriber information database 331 to address the distributions to subscribers. It will be recognized by those skilled in the art that portions of the contents shown in memory 330 may be maintained in the volatile memory device, on a persistent storage device, or both, depending upon the state of the addressing computer system at any given time.

Figure 4:
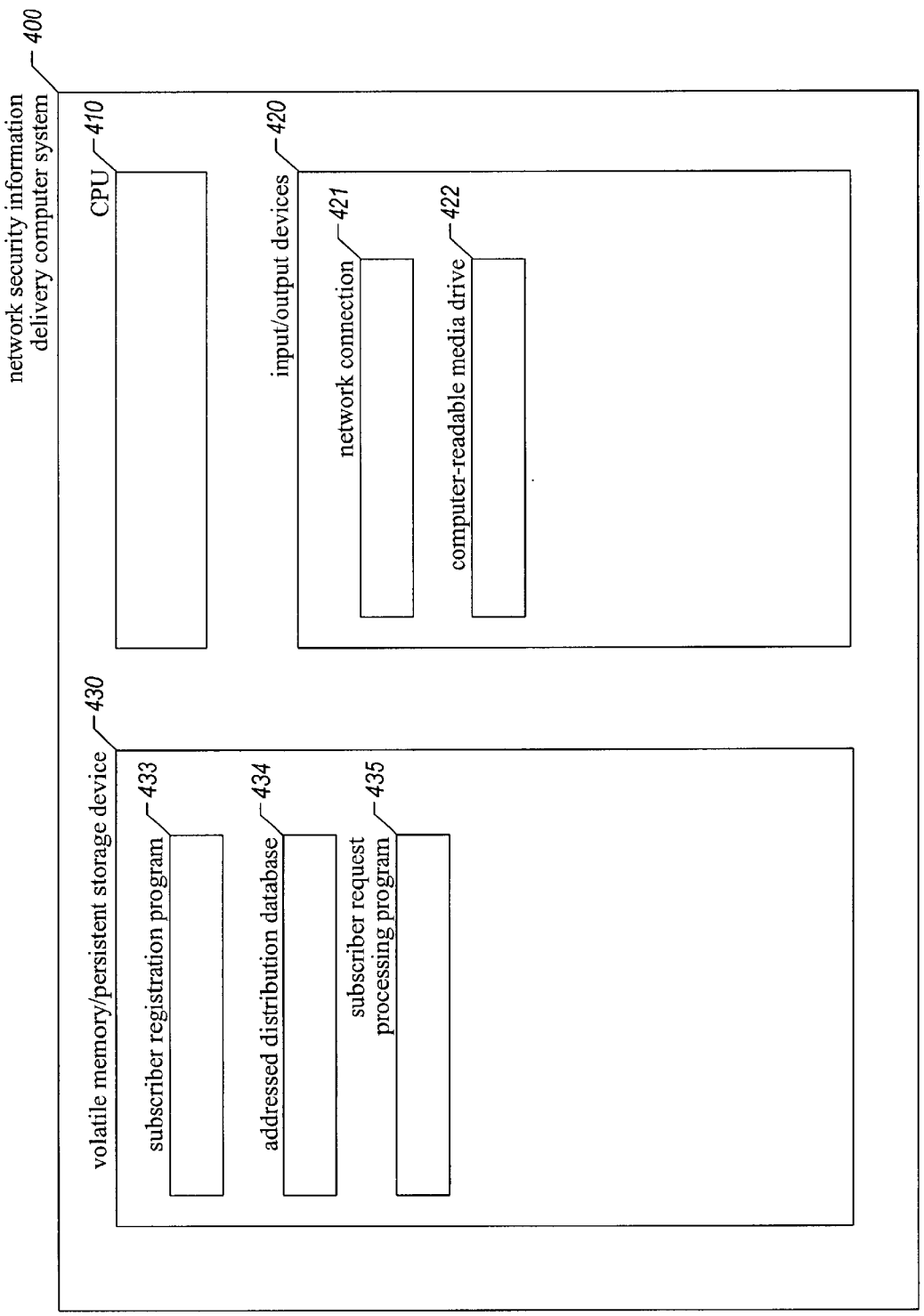
FIG. 4 is a high-level block diagram of a typical delivery computer system.

FIG. 4 is a high-level block diagram of a typical delivery computer system. The delivery computer system 400 has CPUs 410 and input/output devices 420 similar to the addressing computer system. The memory 430 of the delivery computer system contains a portion of the facility called the "subscriber registration program" 433, which registers new subscribers with the network security information service. The memory 430 further contains a database 434 of addressed distributions or use in delivering distributions. The memory 430 also contains a portion of the facility called the "subscriber request processing program" 435 which delivers distributions addressed to a particular subscriber when a polling request is received from that subscriber.

Figure 5:
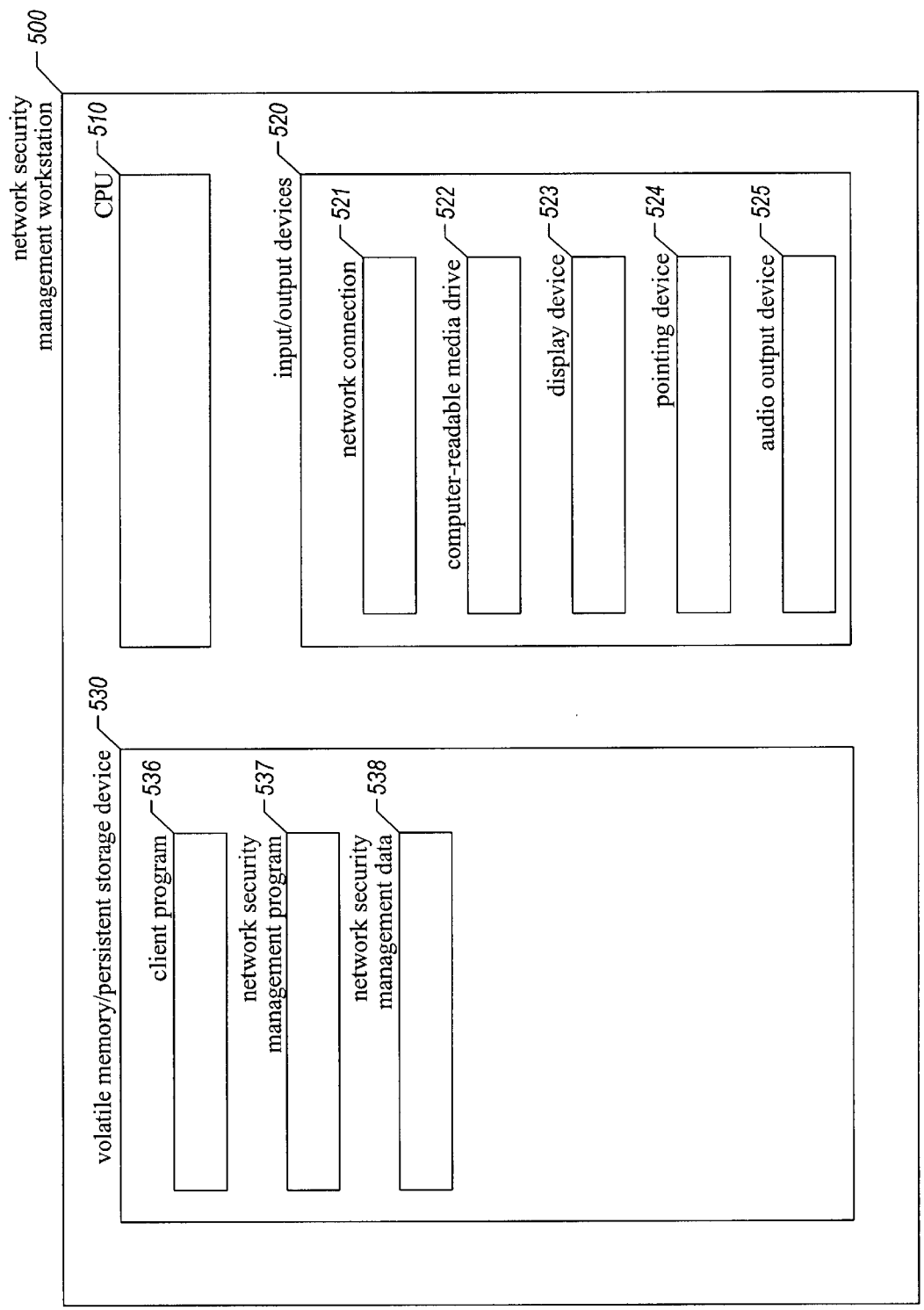
FIG. 5 is a high-level block diagram of a typical network security management workstation operated by a subscriber.

FIG. 5 is a high-level block diagram of a typical network security management workstation operated by a subscriber. The CPUs 510 of the network security management workstation 500 are similar to those of the addressing computer system. The input/output devices 520 of the network security management workstation, in addition to a network connection 521 and a computer-readable media drive 522, include a display device 523 for displaying visual information, such as a video monitor; a pointing device 524 for selecting positions within displayed information, such as a mouse; and an audio output device 525 for outputting audio information, such as a speaker. The memory 530 of the network security management workstation includes a portion of the facility called the "client program" 536, which polls for, receives, and processes distributions. The memory 530 also contains a network security management program 537 that manages the security of the subscriber's network, preferably in conjunction with the network security device. The memory 530 preferably further contains network security management data 538, such as network security rules, used by the network security management program 537.

While the facility is preferably implemented on computer systems configured as described above in conjunction with FIGS. 1–5, those skilled in the art will recognize that it may also be implemented on computer systems having different configurations. Those skilled in the art will further recognize that various functionalities of the facility may be distributed across multiple computer systems in a manner different from that described above in conjunction with FIGS. 1–5.

Figure 6:
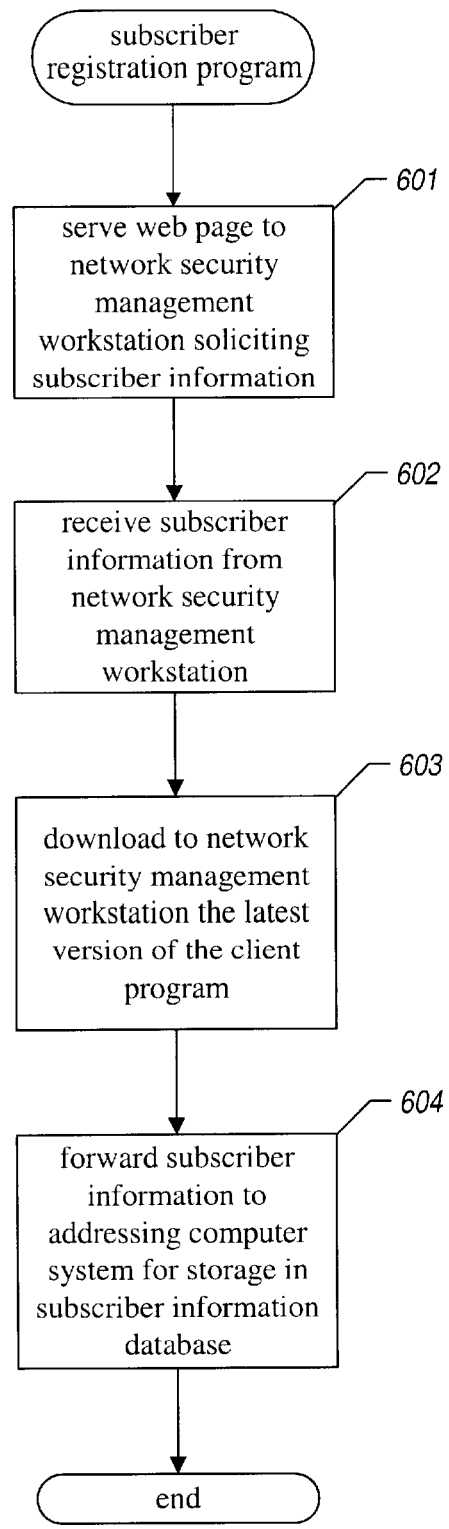
FIG. 6 is a flow diagram showing the steps preferably performed by the facility in the subscriber registration program.

FIG. 6 is a flow diagram showing the steps preferably performed by the facility in the subscriber registration program. The subscriber registration program is preferably executed on each of the delivery computer systems. In step 601, the facility serves a web page to the network security management workstation of a new subscriber that solicits information about the subscriber. FIG. 7 is a display diagram showing such a web page. The web page 710, which is displayed in a web browser window 700, contains fields 720 that can be used by a user at the subscriber to provide information about the subscriber.

Returning to FIG. 6, in step 603, the facility downloads to the network security management workstation the latest version of the client program. In step 604, the facility forwards the subscriber information to the addressing computer system for storage in the subscriber information data base. After step 604, these steps conclude.

FIGS. 8A and 8B are data structure diagrams showing typical contents of the subscriber information database. The contents of the subscriber information database are used by the facility to address distributions to the appropriate subset of subscribers.

FIG. 8A shows a primary subscriber information database table in which subscriber information is stored. The primary subscriber information database table 800 contains a number of rows, such as rows 811–813, each representing a different subscriber. Each row is divided into columns relating to different types of information, such as column 801 containing a subscriber identifier uniquely identifying the subscriber, column 802 containing an indication of the type of primary network security device used by the subscriber, column 803 containing an indication of the version of the network security software used by the subscriber, column 804 indicating the contract type of the subscriber indicating the level of service to be provided to the subscriber, and column 805 contain the maximum permissible level of encryption that can be provided to the subscriber.

FIG. 8B shows a secondary subscriber information database table in which additional subscriber information is stored. In particular, the secondary subscriber information database table includes subscriber information relating to supplemental attributes not represented in the primary subscriber information database table. The secondary subscriber information database table 850 contains a number of rows, such as rows 861, 862, 863, and 871, each representing a different subscriber attribute. Each row of the secondary subscriber information database table is divided into the following columns: a subscriber identifier 851 of a subscriber having a supplemental attribute; a subscriber attribute column 852 containing an indication of the supplemental attribute of the subscriber to which the row relates; and an attribute value column 853 containing the value of that attribute. For example, row 861 indicates that the subscriber having subscriber identifier 1516 has the value "MS Exchange" for the supplemental attribute "application," or that this subscriber uses the MS Exchange application. While the subscriber information database is shown in this form in order to facilitate an appreciation for its contents, those skilled in the art will recognize that the subscriber information database may be organized in other, more efficient ways. Those skilled in the art will also recognize that additional types of information about each subscriber may be stored in the subscriber information database and used to address distributions.

Figure 9:
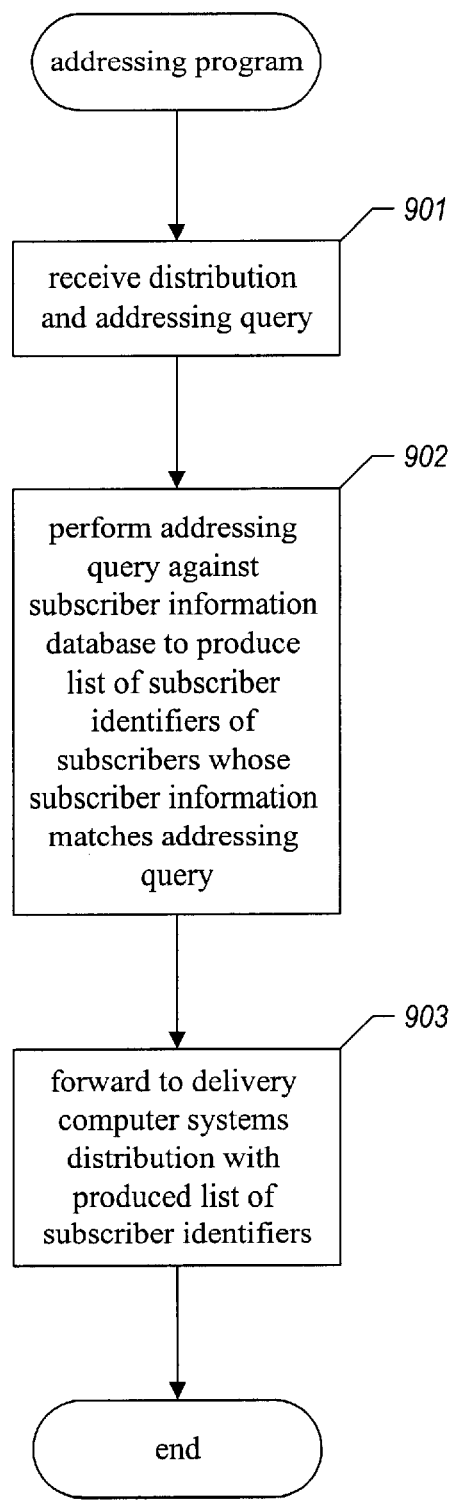
FIG. 9 is a flow diagram showing the steps preferably performed by the facility in the addressing program.

FIG. 9 is a flow diagram showing the steps preferably performed by the facility in the addressing program. The addressing program preferably executes on each of the addressing computer systems. In step 901, the facility receives a distribution, also known as an "instance of network security information." With the distribution, the facility receives an addressing query reflecting the subset of subscribers to which the distribution is to be addressed.

Figure 10:
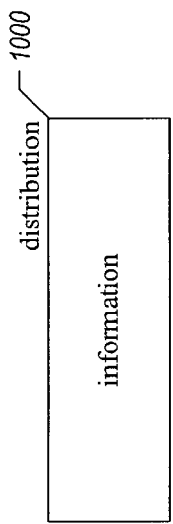
FIG. 10 is a data structure diagram showing a distribution containing information.
Figure 11:
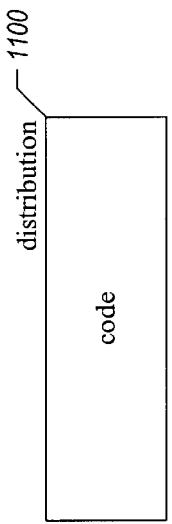
FIG. 11 is a data structure diagram showing a distribution containing code.
Figure 12:
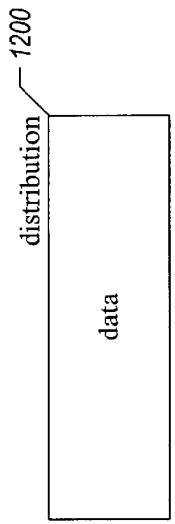
FIG. 12 is a data structure diagram showing a distribution containing network security data.

FIGS. 10–12 are data structure diagrams showing sample distribution contents. FIG. 10 is a data structure diagram showing a distribution 1000 containing information, such as textual information, informing subscribers of the distribution about network security issues. Such a distribution is called an "information alert" distribution.

FIG. 11 is a data structure diagram showing a distribution 1100 containing code that may be executed by the subscriber to provide enhanced network security. The code may be designed to be executed once upon receipt in order to test and/or modify the state of the security management work station and/or the network security device. Alternatively, the code may be designed for continuous execution on one or both of those computer systems. Such a distribution is called a "threat response" distribution if it addresses a particular newly-identified threat to network security. On the other hand, such a distribution is called a "software update" distribution if it replaces software that regularly executes on the security management workstation or network security device with a newer version. FIG. 12 is a data structure diagram showing a distribution 1200 containing network security data. In general, such distributions generally address particular threats, and therefore constitute a threat response.

Returning to FIG. 9, in step 902, the facility performs the addressing query against the subscriber information database to produce a list of a subscriber identifiers of subscribers whose subscriber information matches the addressing query. These subscribers are called "addressees" of the distribution. In step 903, the facility forwards to the delivery computer systems both the distribution and the list of subscriber identifiers produced in step 902 for storage in the addressed distribution database maintained by each delivery computer system. Where a portion of the subscribers identified by the produced subscriber identifiers have requested to receive distributions via encrypted email, the contents of the distribution and the subscriber identifiers of these subscribers are preferably instead transmitted to an encrypted mail server computer system among the delivery computer systems. After step 903, these steps conclude.

FIG. 13 is a data structure diagram showing typical contents of the addressed distribution database. The addressed distribution database is preferably stored on each delivery computer system. In the addressed distribution database 1300, the major rows, such as major rows 1310, 1320, and 1330, each correspond to a different distribution. A major row contains the contents of a distribution, and one or more minor rows each corresponding to a different addressee of the distribution. For example, major row 1310 includes minor rows such as minor rows 1311–1313. Each minor row contains the subscriber identifier of one addressee of the distribution, indication of the date and time at which the distribution was delivered to the addressee if the distribution has been delivered to the addressee. The addressed distribution database is used by each delivery computer system to determine whether any distributions have been addressed to subscribers that have not yet been delivered. For example, if a delivery computer system received a polling request from the subscriber having subscriber identifier 2497, the facility would use the address distribution database to determine that the distributions represented by major rows 1320 and 1330 have not yet been delivered to this subscriber, as minor rows 1321 and 1331 do not contain a delivery date.

While the addressed distribution database is shown in this form in order to facilitate an appreciation for its contents, those skilled in the art will recognize that the addressed distribution database may be organized in other, more efficient ways. For example, rather than directly containing the distribution contents, the addressed distribution database may contain references to the distribution contents stored in another location. Further, the addressed distribution database may be indexed by subscriber identifier to facilitate reference into the addressed distribution database for a particular subscriber. Additionally, the addressed distribution database could be organized in accordance with each subscriber identifier rather than in accordance with each distribution.

Figure 14:
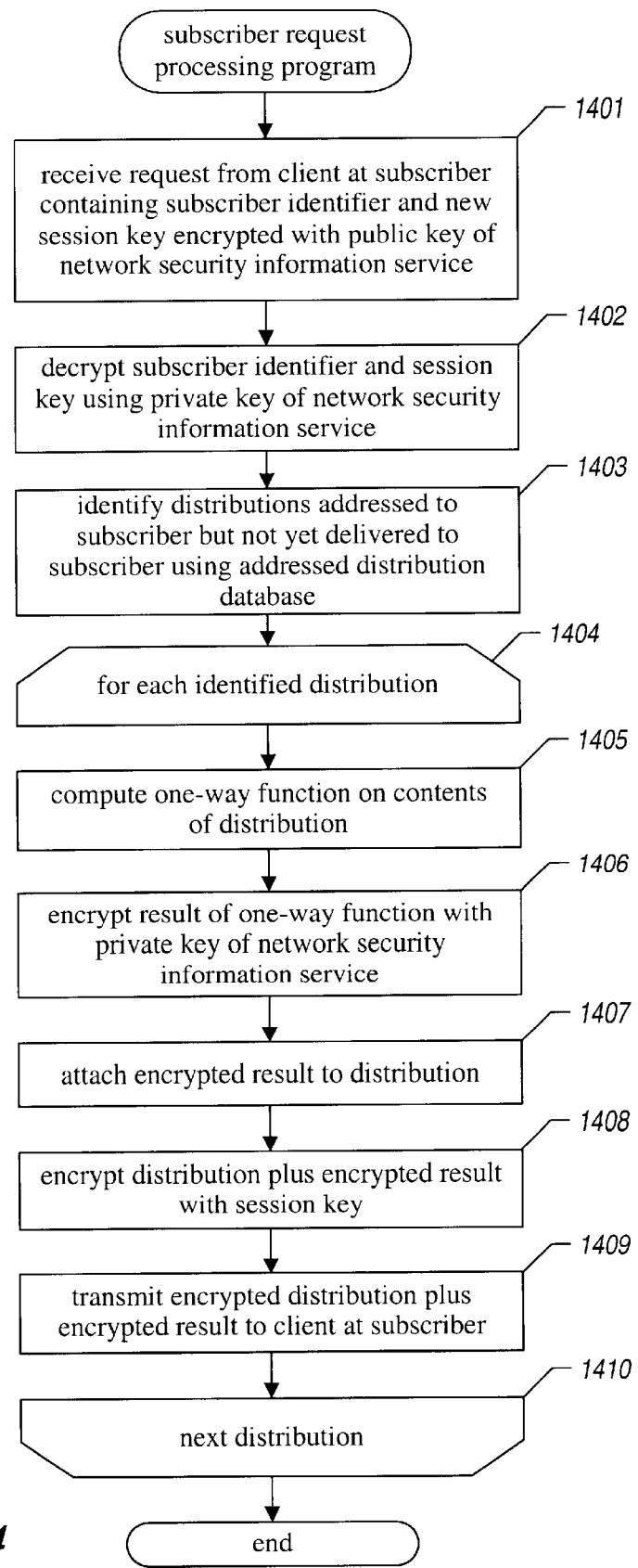
FIG. 14 is a flow diagram showing the steps preferably performed by the facility in the subscriber request processing program.

FIG. 14 is a flow diagram showing the steps preferably performed by the facility in the subscriber request processing program. In step 1401, the facility receives a polling request from the program executing on the network security management workstation client at a subscriber. The request contains the subscriber identifier of the subscriber and a new session encryption key generated by the client. The subscriber identifier and the session key are preferably encrypted with the public key of the network security information service.

Figure 15:
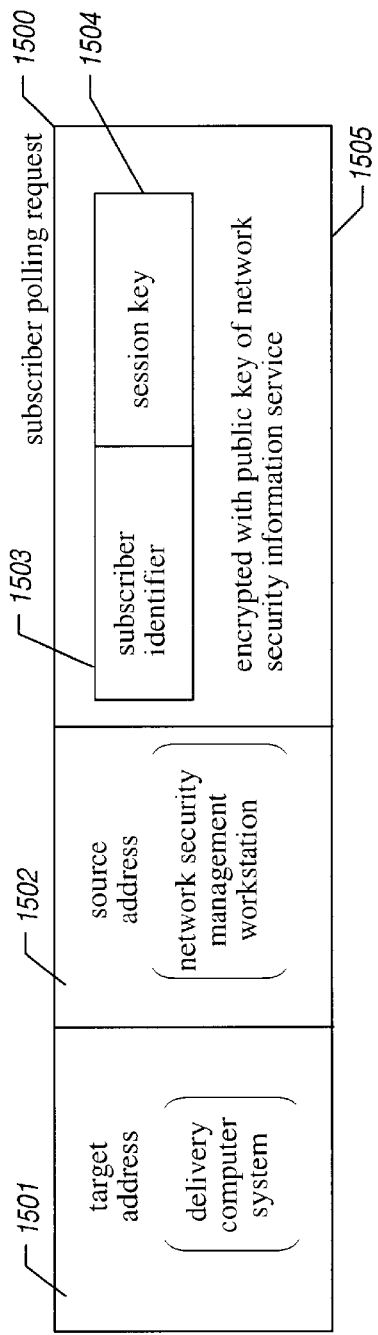
FIG. 15 is a data structure diagram showing the contents of a polling request sent from the client at a subscriber to a delivery computer system.

FIG. 15 is a data structure diagram showing the contents of a polling request sent from the client at a subscriber to a delivery computer system. The client request 1500 contains the target address of the request—that is, the address of the delivery computer system. The client request 1500 further contains a source address 1502 for the request—that is, the address of the network security management workstation upon which the client is executing. The client request 1500 further contains a section 1505 in which the subscriber identifier 1503 of the subscriber and the session key 1504 generated by the client are encrypted with the public key of the network security information service.

Returning to FIG. 14, in step 1402, the facility decrypts the subscriber identifier and session key using the private key of the network security information service. In step 1403, the facility uses the addressed distribution database to identify distributions addressed to the subscriber but not yet delivered to the subscriber. In steps 1404–1410, the facility loops through each distribution identified in step 1403. In step 1405, the facility computes a one-way function on the contents of the distribution. The result of this one-way function is a characterization of the contents of the distribution. In general, the one-way function produces different results for distributions having different contents. In step 1406, the facility encrypts the result of the one-way function with the private key of the network security information service. In step 1407, the facility attaches the encrypted result of step 1406 to the contents of the distribution. Then, in step 1408, the facility encrypts the distribution and encrypted one-way function result with the session key received from the client. In step 1409, the facility transmits the encrypted distribution contents and one-way function result to the client.

Figure 16:
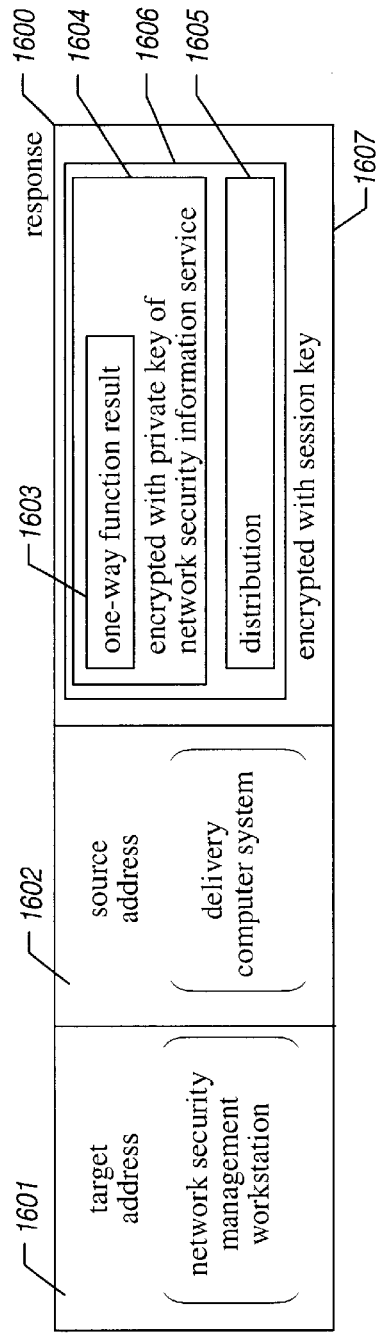
FIG. 16 is a data structure diagram showing a response to a client request transmitted from the delivery computer system receiving the client request to the client transmitting the client request.

FIG. 16 is a data structure diagram showing a response to a client request transmitted from the delivery computer system receiving the client request to the client transmitting the client request. The response 1600 contains a target address 1601—that is, the address of the network security management workstation on which the requesting client is executing. The response 1600 further contains a source address 1602—that is, the address of the delivery computer system. The response 1600 also contains a portion 1607, in which block 1606 is encrypted with the session key received from the client. Block 1606 in turn contains the contents of a distribution addressed to the subscriber as well as encrypted block 1604. In encrypted block 1604, the one-way function result 1603 is encrypted with the private key of the network security information service. Returning to FIG. 14, in step 1410, if additional identified distributions remain to be processed, then the facility loops back to step 1404 to process the next identified distribution. After step 1410, the steps conclude.

Figure 17A:
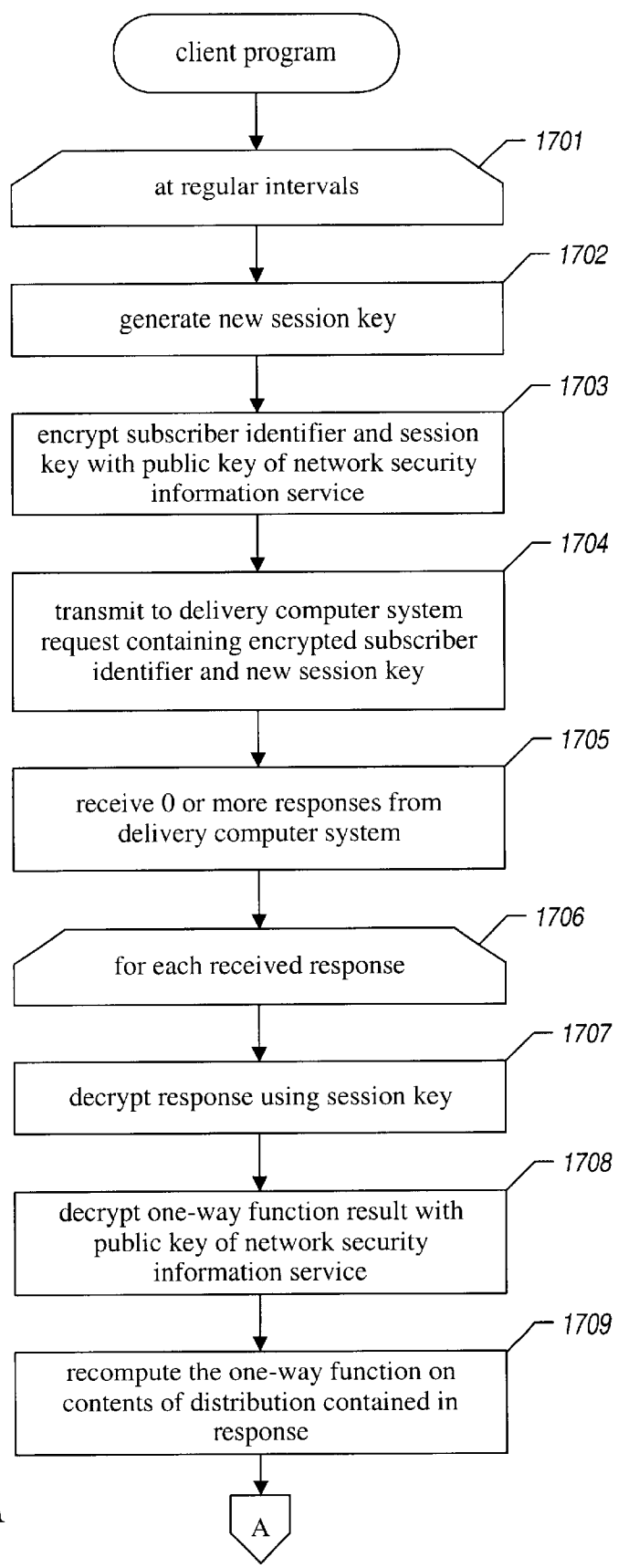
FIG. 17 is a flow diagram showing the steps preferably performed by the facility in the client program.
Figure 17B:
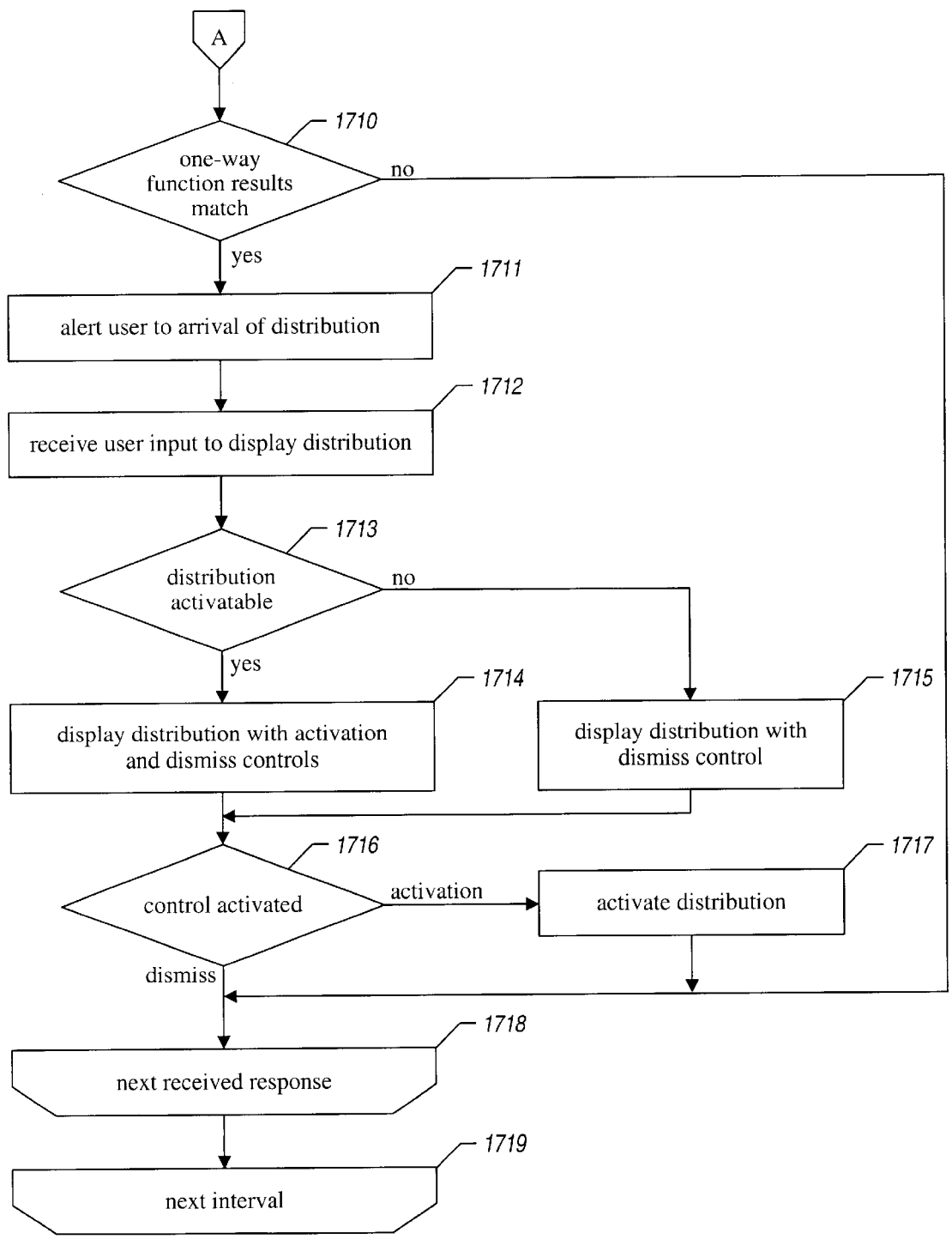

FIG. 17 is a flow diagram showing the steps preferably performed by the facility in the client program. The client program is preferably executed in the network security management workstation at each subscriber. The facility preferably loops through steps 1701–1719 at regular intervals, such as every fifteen minutes. In step 1702, the facility generates a new session key to use in communicating with the delivery computer system to which is it assigned. In step 1703, the facility encrypts the subscriber identifier of the subscriber and the session key generated in step 1702 with the public key of the network security information service. In step 1704, the facility transmits to the delivery computer system a polling request for new distributions addressed to the subscriber. The request contains the encrypted subscriber identifier and session key generated in step 1703. In step 1705, the facility receives zero or more responses from the delivery computer system. Each received response constitutes the delivery of one distribution.

Figure 18:
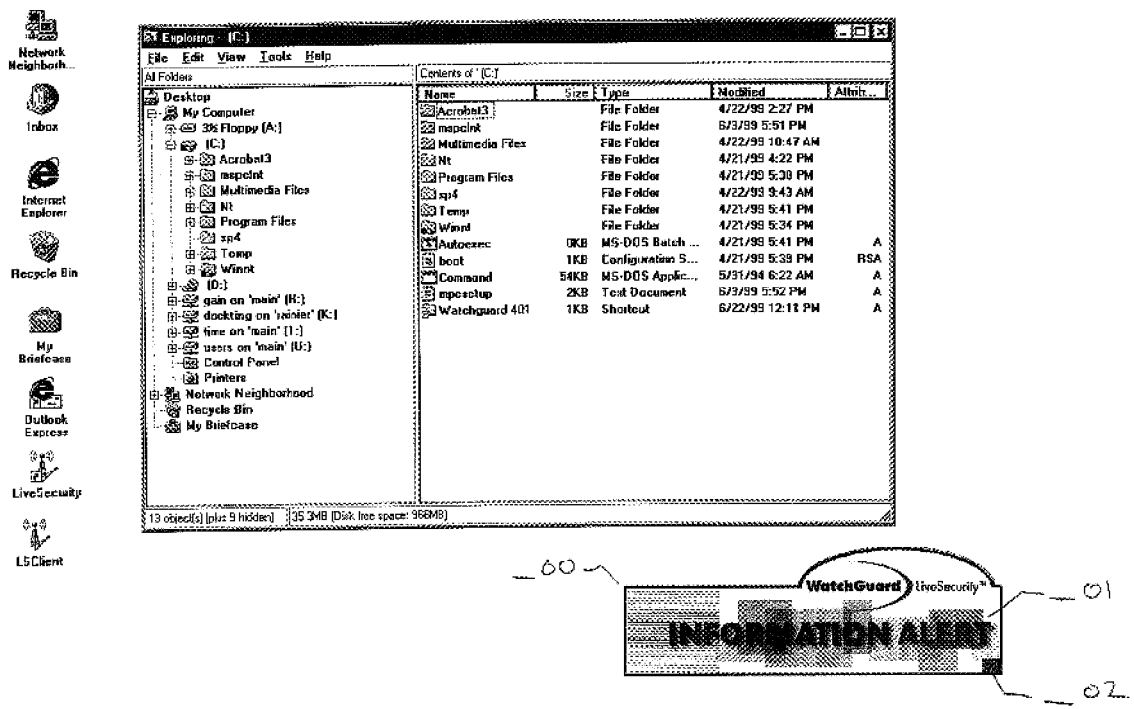
FIG. 18 is a display diagram showing the display of a visual alert.

In steps 1706–1718, the facility loops through each received response. If no response is received, the facility continues in step 1719. In step 1707, the facility decrypts the response using the session key generated in step 1702. In step 1708, the facility uses the public key of the network security information service to decrypt the one-way function result contained in the response. In step 1709, the facility recomputes the one-way function on the distribution contents contained in the response. In step 1710, if the one-way function result generated in step 1709 matches the one-way function result contained in the response, then the facility continues in step 1711 to process the distribution, else the facility continues in step 1718. In step 1711, the facility alerts the user to the arrival of the distribution. In step 1711, the facility may display a visual alert, output an audible alert, or both. FIG. 18 is a display diagram showing the display of a visual alert. Visual alert 1800 is displayed when a valid distribution is received. In response, the user may press button 1801 to review the distribution, or may press button 1802 to dismiss the visual alert.

Figure 19:
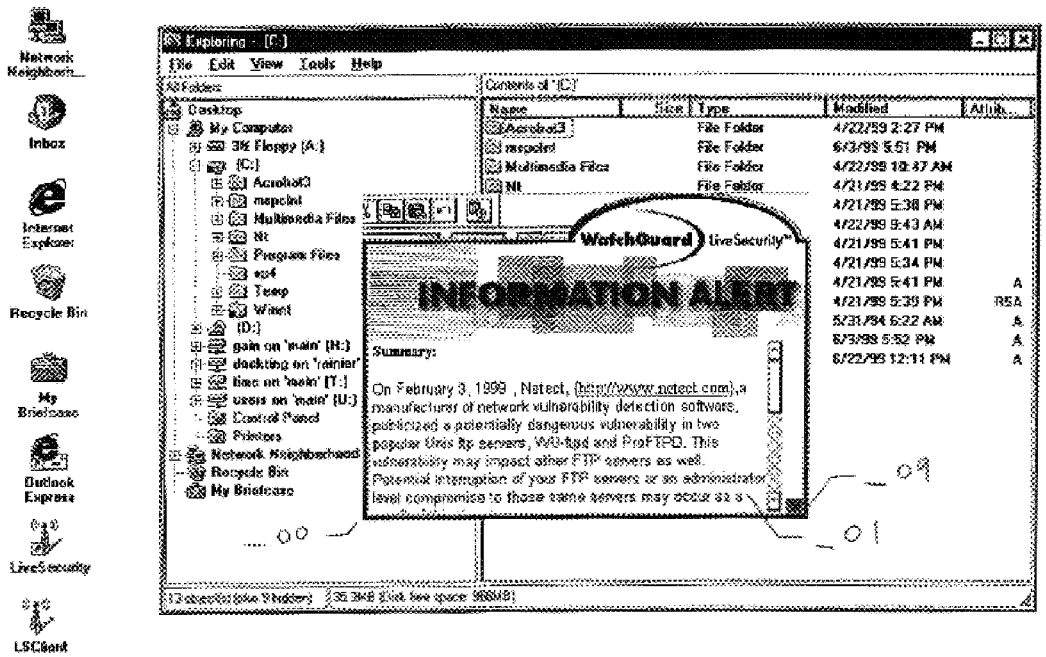
FIG. 19 is a display diagram showing the display of a distribution containing information.

Returning to FIG. 17, in step 1712, the facility receives user input to display information about the current distribution. FIG. 19 is a display diagram showing the display of a distribution containing information. Window 1900 shows the contents of an information alert distribution. The information alert distribution has textual contents 1901 discussing a network security issue. Window 1900 further contains button 1909, which can be selected to close window 1900.

Figure 20:
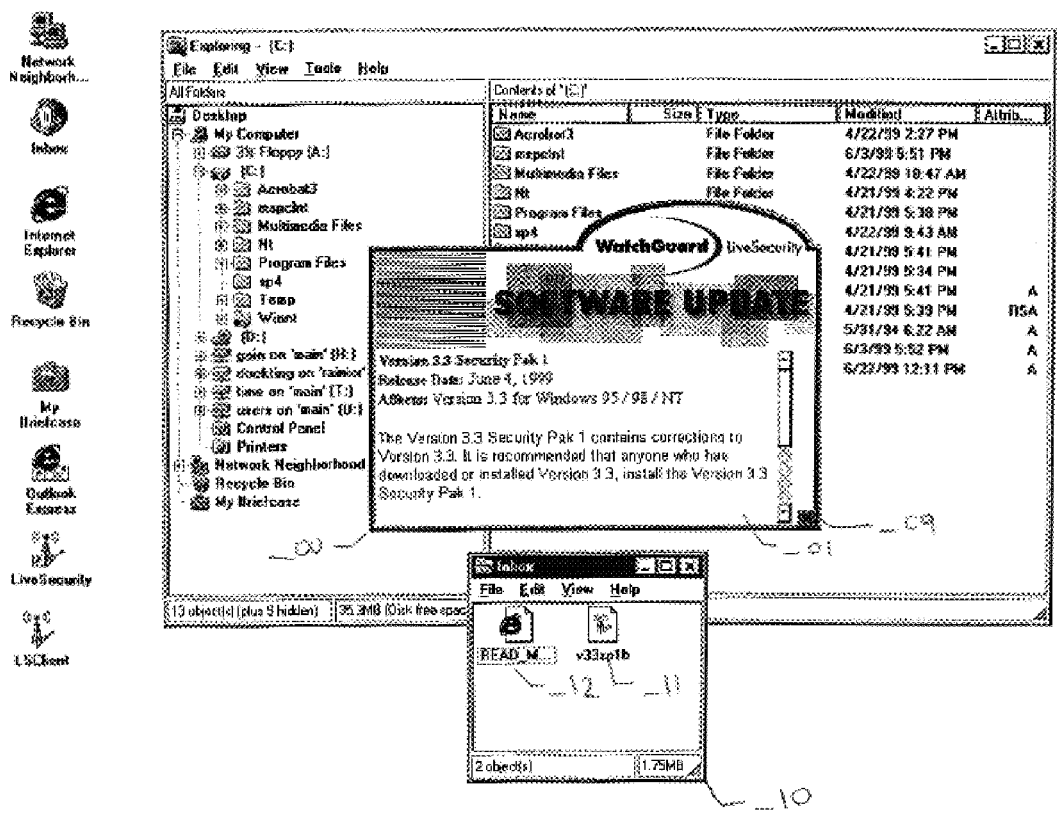
FIG. 20 is a display diagram showing the display of a software update distribution containing code.

FIG. 20 is a display diagram showing the display of a software update distribution containing code. Window 2000 contains information 2001 about updated network security code that is to be installed on the network security management workstation computer system and/or the network security device. Window 2010 contains the code 2011 that is to be installed, as well as a file 2012 containing additional information about the code. In a further preferred embodiment, Window 2000 directly contains a visual control that may be selected by the user to install the software update.

Figure 21:
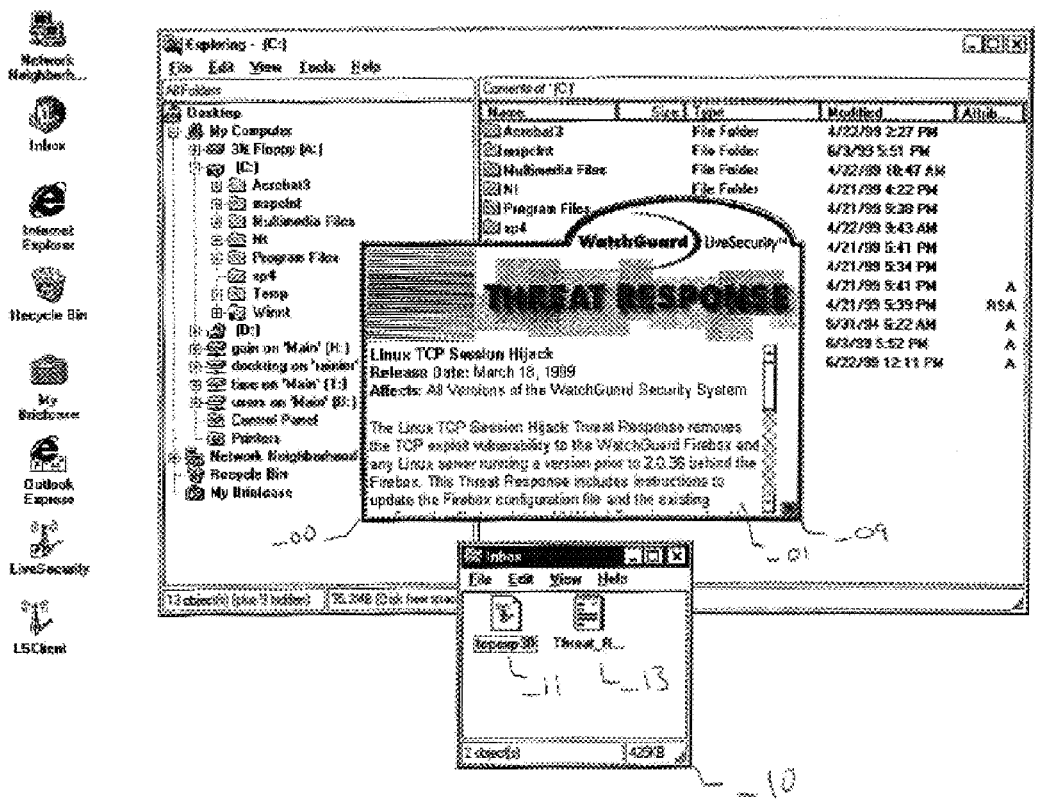
FIGS. 21–23 are display diagrams showing the display of a threat response distribution.
Figure 22:
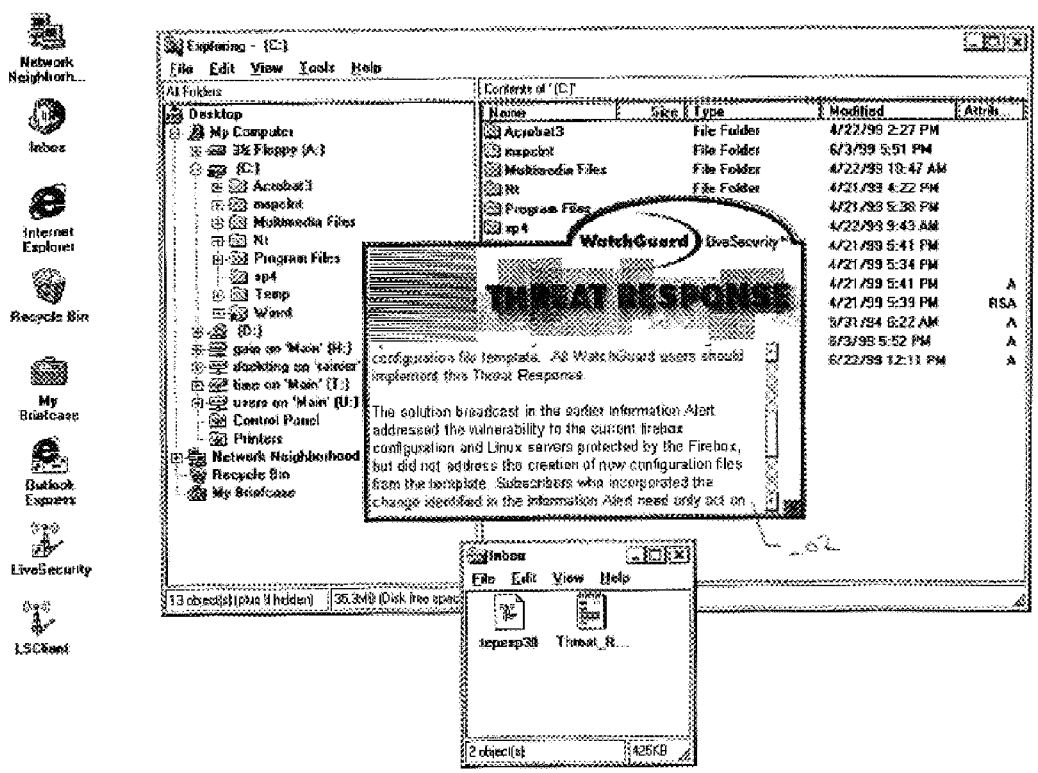
Figure 23:
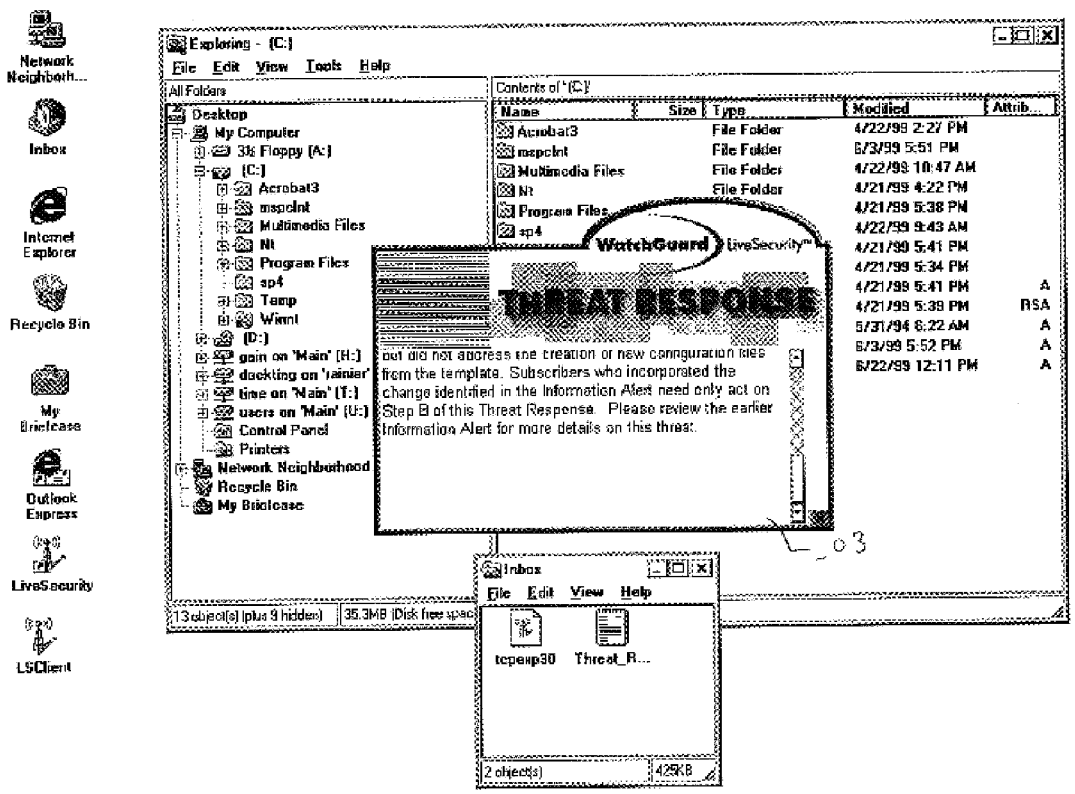

FIGS. 21–23 are display diagrams showing the display of a threat response distribution. The client displays Window 2100, which contains essential information 2101, 2202, 2303 about the threat and a proposed response. Client also displays Window 2110 containing new network security rules 2111 and additional information 2113 to be used in responding to the threat. In a further preferred embodiment, Window 2100 contains a visual control that may be selected by the user in order to activate the distribution.

Returning to FIG. 17, in step 1713, if the distribution is activatable, then the facility continues in step 1714, else the facility continues in step 1715. In step 1714, the facility displays information about the distribution with controls for activating and dismissing the distribution. After step 1714, the facility continues in step 1716. In step 1715, the facility displays information about the distribution with a control for dismissing the distribution. After step 1715, the facility continues in step 1716. In step 1716, if an activation control is selected, then the facility continues in step 1717 to activate the distribution, else the dismiss control is selected and the facility continues in step 1718. For distributions containing network security data, step 1717 preferably involves storing the security data in a particular manner on the network security management workstation and/or on the network security device. For distributions containing code, step 1717 preferably involves executing and/or installing the code on the network security workstation and/or on the network security device. In step 1718, the facility loops back to step 1706 to process the next received response. In step 1719, the facility waits until the next interval expires, then loops back to step 1701 in order to generate a new polling request. In a further preferred embodiment, in response to a user command, the facility loops back to step 1701 to generate a new polling request before the expiration of the next interval.

Figure 24:
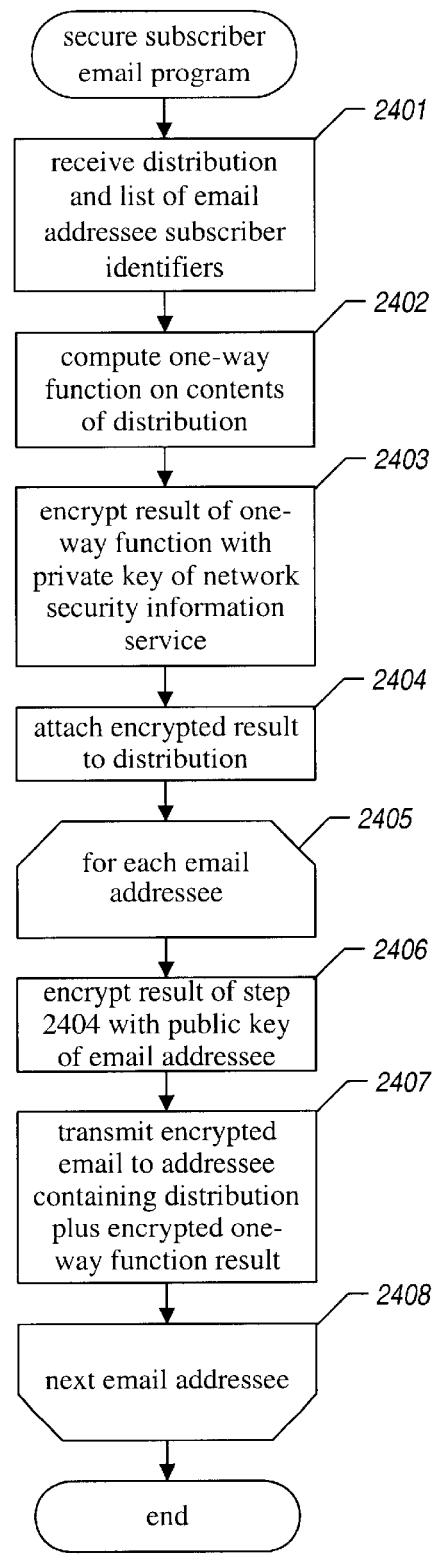
FIG. 24 is a flow diagram showing the steps preferably performed by the facility in a secure subscriber email program preferably executing on an encrypted mail server among the distribution computer systems.
Figure 25:
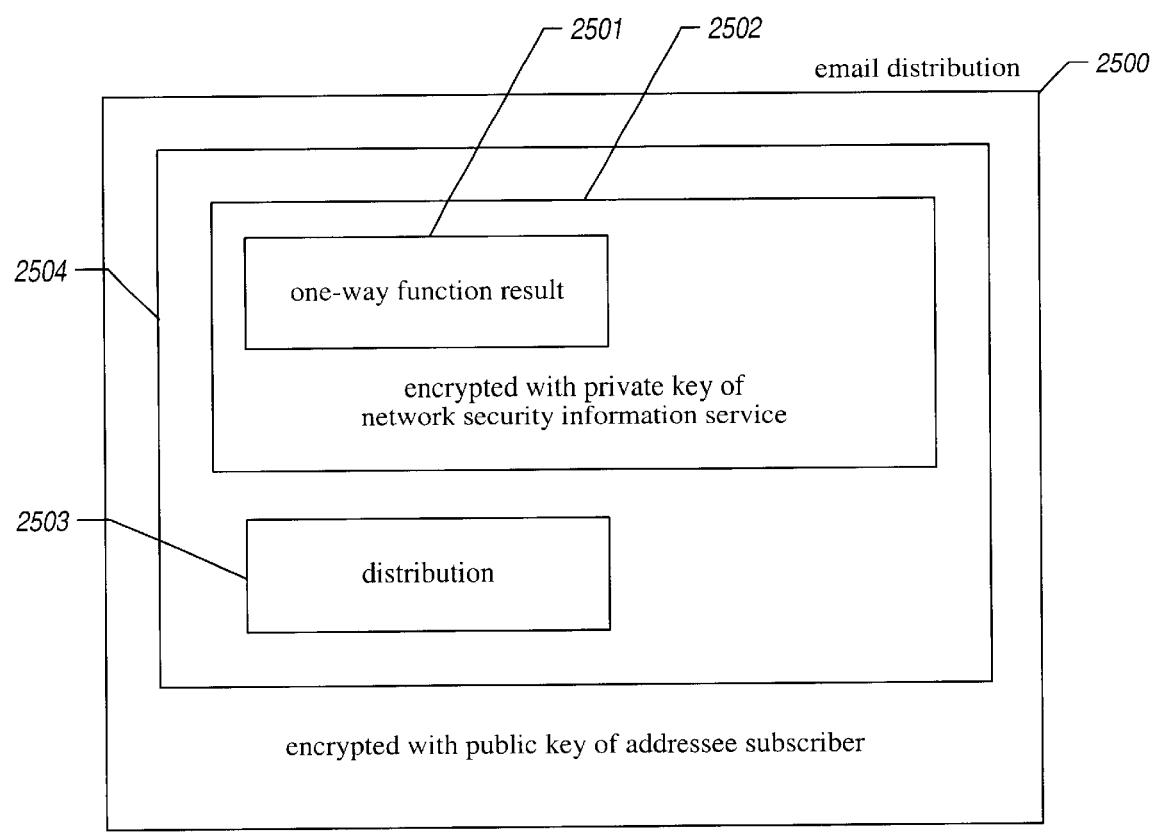
FIG. 25 is a data structure diagram showing an email distribution transmitted from the encrypted email server computer system to a network security management workstation at a client.
Figure 26:
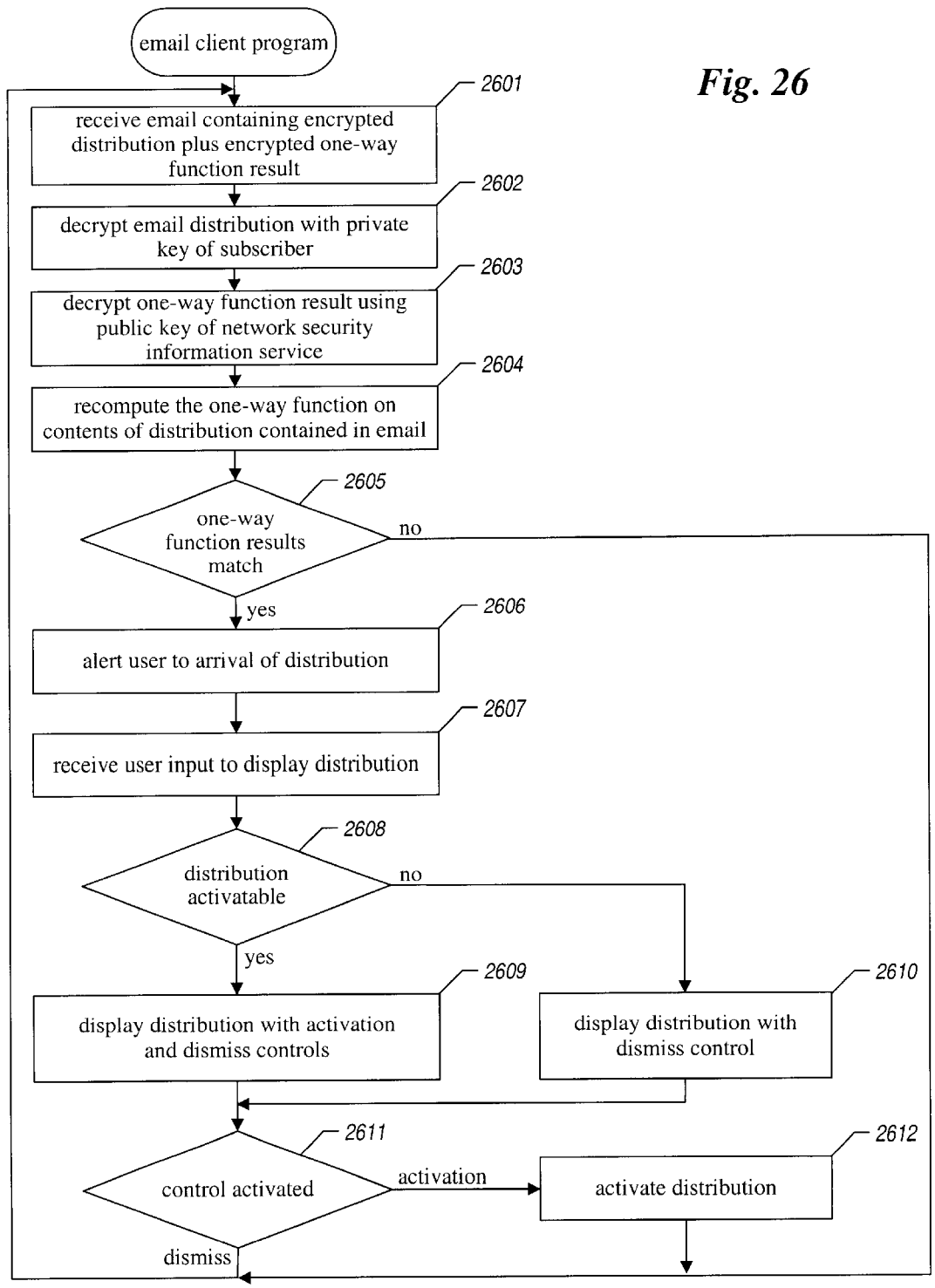
FIG. 26 is a flow diagram showing the steps preferably performed by the facility in an encrypted email version of the client program.

FIGS. 24–26 illustrate the delivery of distributions via encrypted email. FIG. 24 is a flow diagram showing the steps preferably performed by the facility in a secure subscriber email program preferably executing on an encrypted mail server among the distribution computer systems. In step 2401, the facility receives from the addressing computer system the contents of a distribution and a list of subscriber identifiers for subscribers that are to receive the distribution via encrypted email. In step 2402, the facility computers a one-way function on the contents of the distribution. In step 2403, the facility encrypts the result of the one-way function with the private key of the network security information service. In step 2404, the facility attaches the encrypted result of step 2403 to the contents of the distribution. In steps 2405–2408, the facility loops through each email addressee in the received list of email addressees. In step 2406, the facility encrypts the results of step 2404 using the public key of the current email addressee. In step 2407, the facility transmits an email to the current addressee containing the result of step 2406. In step 2408, if additional email addressees remain, then the facility loops back to step 2405 to process the next email addressee. After step 2408, these steps conclude.

FIG. 25 is a data structure diagram showing an email distribution transmitted from the encrypted email server computer system to a network security management workstation at a client. The email distribution is preferably generated in accordance with steps 2402, 2403, 2404, and 2406 discussed above. The email distribution 2500 contains a one-way function result 2501, which is encrypted with the private key of the network security information service to form encrypted block 2502. Encrypted block 2502 and the distribution 2503 are aggregated together in block 2504. Block 2504 is in turn encrypted with the public key of the addressee subscriber to constitute email distribution 2500.

FIG. 26 is a flow diagram showing the steps preferably performed by the facility in an encrypted email version of the client program. The encrypted email version of the client program preferably executes on a network management workstation at a subscriber. In step 2601, the facility receives an encrypted email containing a new distribution plus an encrypted one-way function result. In step 2602, the facility uses the private key of the subscriber to decrypt the email distribution 2500 to obtain block 2504. In step 2603, the facility decrypts the encrypted one-way function result 2502 using the public key of the network security information service to obtain the one-way function result 2501. In step 2604, the facility recomputes the one-way function on the contents of the distribution 2503. In step 2605, if the one-way function result generated in step 2604 matches the one-way function result 2501 contained in the email, then the facility continues in step 2606 to process the distribution, else the facility continues in step 2601 to receive the next email. In step 2606, the facility alerts the user to the route of the distribution. In step 2606, the facility may display a visual alert, output an audible word, or both. In step 2607, the facility receives user input to display information about the current distribution. In step 2608, if the distribution is activatable, then the facility continues in step 2609, else the facility continues in step 2610. In step 2609, the facility displays information about the distribution with controls for activating and dismissing the distribution. After step 2609, the facility continues in step 2611. In step 2610, the facility displays information about the distribution with the control for dismissing the distribution. After step 2610, the facility continues in step 2611. In step 2611, if an activation control is selected, the facility continues in step 2612 to activate the distribution, else the dismiss control is selected and the facility continues in step 2601 to receive the next email. In some embodiments, certain sensitive types of distribution contents are not enclosed directly in emailed distributions, but rather are enclosed by reference. In particular, the emailed distribution contains a secure http link to a secure http server from which the sensitive contents may be retrieved. In such cases, the facility in step 2612 dereferences the secure http reference in order to retrieve the sensitive contents via a secure http from the secure http server. After step 2612, the facility continues in step 2601 to receive the next emailed distribution.

While this invention has been shown and described with reference to preferred embodiments, it will be understood by those skilled in the art that various changes or modifications in form and detail may be made without departing from the scope of the invention. For example, the facility may be implemented across arrangements of computer systems different than those discussed, and may use other types of encryption and certification than those discussed. Also, the facility could be used to distribute other types of related information.

We claim:

1. A method in one or more computer systems for distributing network security information, comprising:

receiving network security information;

receiving recipient selection information specifying a characteristic of prospective recipients to be used in selecting recipients for the security information;

comparing the received recipient selection information to each of a plurality of prospective recipient profiles, each prospective recipient profile corresponding to one or more prospective recipients and indicating one or more characteristics of the prospective recipients relating to the receipt of network security information;

based upon the comparison, selecting at least a portion of the plurality of prospective recipients as recipients of the network security information;

addressing the network security information to each of the selected recipients, wherein the network security information is usable by at least one of the selected recipients to modify the behavior of a network security device associated with the selected recipient to better protect the selected recipient against a newly identified network security threat; and in one of the selected recipients, automatically using the network security information to modify the behavior of a network security device associated with the selected recipient.

2. The method of claim 1 wherein the network security information is used to modify the behavior of a network security device associated with the selected recipient directly in response to a single user interaction.

3. The method of claim 1 wherein the network security information is used to modify the behavior of a network security device associated with the selected recipient directly in response to the receipt of the network security information.

4. A computer-readable medium whose contents cause one or more computer systems to distribute network security information by:

receiving network security information;

receiving recipient selection information specifying a characteristic of prospective recipients to be used in selecting recipients for the security information;

comparing the received recipient selection information to each of a plurality of prospective recipient profiles, each prospective recipient profile corresponding to one or more prospective recipients and indicating one or more characteristics of the prospective recipients relating to the receipt of network security information;

based upon the comparison, selecting at least a portion of the plurality of prospective recipients as recipients of the network security information;

addressing the network security information to each of the selected recipients, wherein the network security information is usable by at least one of the selected recipients to modify the behavior of a network security device associated with the selected recipient to better protect the selected recipient against a newly identified network security threat; and in one of the selected recipients, automatically using the network security information to modify the behavior of a network security device associated with the selected recipient.

5. The computer-readable medium of claim 4 wherein the network security information is used to modify the behavior of a network security device associated with the selected recipient directly in response to a single user interaction.

6. The computer-readable medium of claim 4 wherein the network security information is used to modify the behavior of a network security device associated with the selected recipient directly in response to the receipt of the network security information.

7. One or more computer systems for distributing network security information, comprising:

a receiver that receives network security information, and that receives recipient selection information specifying a characteristic of prospective recipients to be used in selecting recipients for the security information;

a comparison subsystem that compares the received recipient selection information to each of a plurality of prospective recipient profiles, each prospective recipient profile corresponding to one or more prospective recipients, and indicating one or more characteristics of the prospective recipients relating to the receipt of network security information;

a recipient selector that, based upon the comparison performed by the comparison subsystem, selects at least a portion of the plurality of prospective recipients as recipients of the network security information;

an addressing subsystem that addresses the network security information to each of the selected recipients, wherein the network security information is usable by at least one of the selected recipients to modify the behavior of a network security device associated with the selected recipient to better protect the selected recipient against a newly identified network security threat; and a network security information use subsystem in one of the selected recipients that automatically uses the network security information to modify the behavior of a network security device associated with the selected recipient.

8. The computer systems of claim 7 wherein the network security information use subsystem uses the network security information to modify the behavior of a network security device associated with the selected recipient directly in response to a single user interaction.

9. The computer systems of claim 7 wherein the network security information use subsystem uses the network security information to modify the behavior of a network security device associated with the selected recipient directly in response to the receipt of the network security information.

* * * * *